United States Patent Office 3,007,874
Patented Nov. 7, 1961

3,007,874
PROCESS OF MANUFACTURING TERNARY FERRITES CONTAINING MANGANESE AND ZINC
Jean Peyssou and Avénir Vassiliev, Paris, France, assignors, by mesne assignments, to Steatite Research Corporation, Keasbey, N.J., a corporation of Delaware
No Drawing. Filed May 2, 1958, Ser. No. 732,452
Claims priority, application France May 9, 1957
2 Claims. (Cl. 252—62.5)

The object of the invention is to provide a process for the manufacture of manganese-zinc ferrites.

In French Patent No. 1,120,702 of January 28, 1955, there is described a process for manufacturing ferrites, consisting, in its preferred form, of preparing a mixture by grinding, in the proportions set forth in the patent, the oxides of iron, zinc and manganese, previously obtained by the ordinary process of obtaining a chamotte or calcine of this mixture at between 300° and 1,250° C., preferably in an atmosphere of nitrogen, of grinding the product anew with an appropriate binding agent, of molding and sintering or fritting, preferably at a temperature above 1250° C., in an atmosphere having a high content of water vapor.

One has sought to improve the above process by trying to combine, in a single operation, the preparation (previously separate) of the three oxides, their grinding, their mixing and their chamotting or calcining; hoping thus to obtain an adequate homogeneous mixture and to take advantage of the much greater reactivity of oxides in the nascent state.

But putting this known idea into practice is in fact difficult; the solution indicated in the above patent, i.e., coprecipitation, for example, by means of a base, of the three oxides from a solution of their soluble salts, requires for example, that one succeed in precipitating adequate quantities of the oxides and in properly filtering a great volume of ferric hydrate.

This invention proposes a simple and little onerous process which permits combining, in a single operation, the preparation, the mixing and the calcining of the three oxides.

The process according to the invention consists essentially in calcining, at a temperature of 850° C., a mixture, in proportions which define the final composition of the final ferrite, of oxides, carbonates, oxalates, acetates or other salts of manganese and of zinc, with the ferric oxide hydrate obtained by the wet process; in grinding and molding the co-roasted powder to shape with an appropriate binder, and in submitting the molded piece obtained to thermal sintering.

Preferably the co-roasting or calcining is effected in an oxidizing atmosphere and continued for about 20 minutes, after rapidly heating to the roasting temperature.

The invention will be better understood with the aid of the following actual, though nonlimiting examples:

Example 1

One employs, as raw materials, manganese dioxide $MnO_2$, zinc oxide $ZnO$, and ferric oxide monohydrate

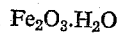

obtained from the wet method of manufacture; the wet state of the ferric oxide favors its dispersion and constitutes a feature of the invention. In contrast, the oxides of manganese and of zinc taken in the state of fine powder, can be any ones, and one can utilize the salts such as the carbonates, oxalates or acetates.

These three constituents are mixed in the following proportions:

| | Mol. percent |
|---|---|
| $Fe_2O_3$ | 50 |
| $MnO_2$ | 25 |
| $ZnO$ | 25 |

In order to remain very homogeneous, the mixture ought to have a creamy consistency and not settle.

The mixture is calcined for about 20 minutes, after rapidly raising the temperature to 900° C., in the non-limiting example, and in an oxidizing atmosphere (excess of air).

The powder obtained is ground, then directly molded with a binder, by pressing or extruding, for example, and fritted or sintered as indicated in the said French patent.

In certain cases, if it is desired to adjust the composition of the roasted mix, convenient quantities of powdered oxides may be added to it, and, then the mixture is calcined, before molding, at a temperature above 1100° C. Preferably the adjustment of the composition will be accomplished by suitably mixing different calcined compositions.

Example 2

One proceeds as in Example 1, but employs the following proportions of the three constituents:

| | Mol. percent |
|---|---|
| $Fe_2O_3$ | 50 |
| $MnO_2$ | 30 |
| $ZnO$ | 20 |

Example 3

One proceeds as in Example 1 but employs the following proportions of the three constituents:

| | Mol. percent |
|---|---|
| $Fe_2O_3$ | 50 |
| $MnO_2$ | 35 |
| $ZnO$ | 15 |

Example 4

One proceeds as in Example 1 but employs the following proportions of the three constituents:

| | Mol. percent |
|---|---|
| $Fe_2O_3$ | 55 |
| $MnO_2$ | 30 |
| $ZnO$ | 15 |

We claim:

1. A process of making Mn-Zn ferrites comprising providing a wet, hydrated ferric oxide and compounds of manganese and zinc selected from the group consisting of oxides, carbonates, oxalates and acetates thereof, mixing said oxides to provide approximately 50 mol percent of hydrated ferric oxide calculated as $Fe_2O_3$ and a combined total of about 50 mol percent of zinc and manganese compounds calculated as $ZnO$ and $MnO$ respectively, the proportion of water with said hydrated ferric oxide being sufficient to provide a creamy consistency to the mass, prefiring the mixture by rapidly raising the temperature of the mass to 850° C. and continuing the heating at a temperature of about 850° C. to 900° C. to provide a calcine, thereafter grinding the calcine to a powder, molding the powder to shape and sintering the molded body at above 1100° C.

2. The process as in claim 1 in which the calcining is effected and continued for 20 minutes in an oxidizing atmosphere after rapidly raising the temperature to the calcining temperature.

References Cited in the file of this patent

UNITED STATES PATENTS

| | | |
|---|---|---|
| 1,997,193 | Kato et al. | Apr. 9, 1935 |
| 2,579,978 | Snoek et al. | Dec. 25, 1951 |
| 2,636,860 | Snoek et al. | Apr. 28, 1953 |
| 2,699,408 | Camras | Jan. 11, 1955 |
| 2,700,023 | Albers-Schoenberg | Jan. 18, 1955 |
| 2,723,238 | Simkiss | Nov. 8, 1955 |
| 2,734,034 | Crowley | Feb. 7, 1956 |
| 2,764,552 | Buckley et al. | Sept. 25, 1956 |
| 2,856,365 | Heck et al. | Oct. 14, 1958 |

FOREIGN PATENTS

| | | |
|---|---|---|
| 683,722 | Great Britain | Dec. 3, 1952 |

OTHER REFERENCES

Fresh: Proceedings of the IRE, October 1956, pp. 1303–1311.

Harvey et al.: RCA Review, September 1950, pp. 344–347.